US009032716B2

(12) United States Patent
Hennecke et al.

(10) Patent No.: US 9,032,716 B2
(45) Date of Patent: May 19, 2015

(54) MOTOR VEHICLE HAVING A STORAGE TANK FOR A REDUCING AGENT

(75) Inventors: Joerg Hennecke, Haar (DE); Andreas Bruhn, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 35 days.

(21) Appl. No.: 13/552,089

(22) Filed: Jul. 18, 2012

(65) Prior Publication Data

US 2012/0279576 A1 Nov. 8, 2012

Related U.S. Application Data

(63) Continuation of application No. PCT/EP2010/068701, filed on Dec. 2, 2010.

(30) Foreign Application Priority Data

Jan. 22, 2010 (DE) .......................... 10 2010 005 406

(51) Int. Cl.
*F01N 3/00* (2006.01)
*F01N 3/02* (2006.01)
*F01N 3/10* (2006.01)
*F01N 3/20* (2006.01)

(52) U.S. Cl.
CPC ............. *F01N 3/206* (2013.01); *F01N 2610/02* (2013.01); *F01N 2610/03* (2013.01); *F01N 2610/1406* (2013.01); *F01N 2610/1413* (2013.01); *F01N 2610/1433* (2013.01); *F01N 2610/1486* (2013.01); *F01N 2610/1466* (2013.01)

(58) Field of Classification Search
USPC .................................................. 60/286, 295
See application file for complete search history.

(56) References Cited

U.S. PATENT DOCUMENTS 5,765,372 A * 6/1998 Mitobe et al. ................... 60/301
5,852,929 A * 12/1998 Kato et al. ....................... 60/274
5,964,089 A * 10/1999 Murphy et al. ................. 60/286

(Continued)

FOREIGN PATENT DOCUMENTS

DE    198 54 997 A1    5/2000
DE    103 19 841 A1    12/2004

(Continued)

OTHER PUBLICATIONS

International Search Report dated Mar. 14, 2011 with English translation (four (4) pages).
German Search Report dated Nov. 29, 2010 with partial English translation (nine (9) pages).

*Primary Examiner* — Audrey K Bradley
*Assistant Examiner* — Dapinder Singh
(74) *Attorney, Agent, or Firm* — Crowell & Moring LLP

(57) ABSTRACT

A motor vehicle includes a tank for storing a liquid reducing agent suppliable to the exhaust system of an internal-combustion engine, and an air delivery device, by which an excess pressure can be built-up in a cushion of air situated in the tank above the reducing agent level. Via the air delivery device, alternatively, a vacuum is generatable in the air cushion, which vacuum supports feeding of the agent into the tank. Via the vacuum in the air cushion, reducing agent can also be returned from a pipe, which leads the reducing agent to the exhaust system, back into the tank, and/or additional liquid reducing agent can be transferred from a storage tank by way of a supply duct.

17 Claims, 1 Drawing Sheet

(56) References Cited

U.S. PATENT DOCUMENTS

| | | | |
|---|---|---|---|
| 6,463,965 B1 | 10/2002 | Rasche et al. | |
| 7,293,406 B2 * | 11/2007 | Lewis et al. | 60/284 |
| 8,397,491 B2 * | 3/2013 | Bauer et al. | 60/286 |
| 2009/0272440 A1 | 11/2009 | Levin | |
| 2010/0319326 A1 | 12/2010 | Haeberer et al. | |

FOREIGN PATENT DOCUMENTS

| | | |
|---|---|---|
| DE | 10 2006 048 636 A1 | 4/2007 |
| DE | 10 2006 061 731 A1 | 7/2008 |
| DE | 10 2007 026 944 A1 | 12/2008 |
| DE | 10 2007 059 635 A1 | 6/2009 |
| EP | 2 199 557 A1 | 6/2010 |

* cited by examiner

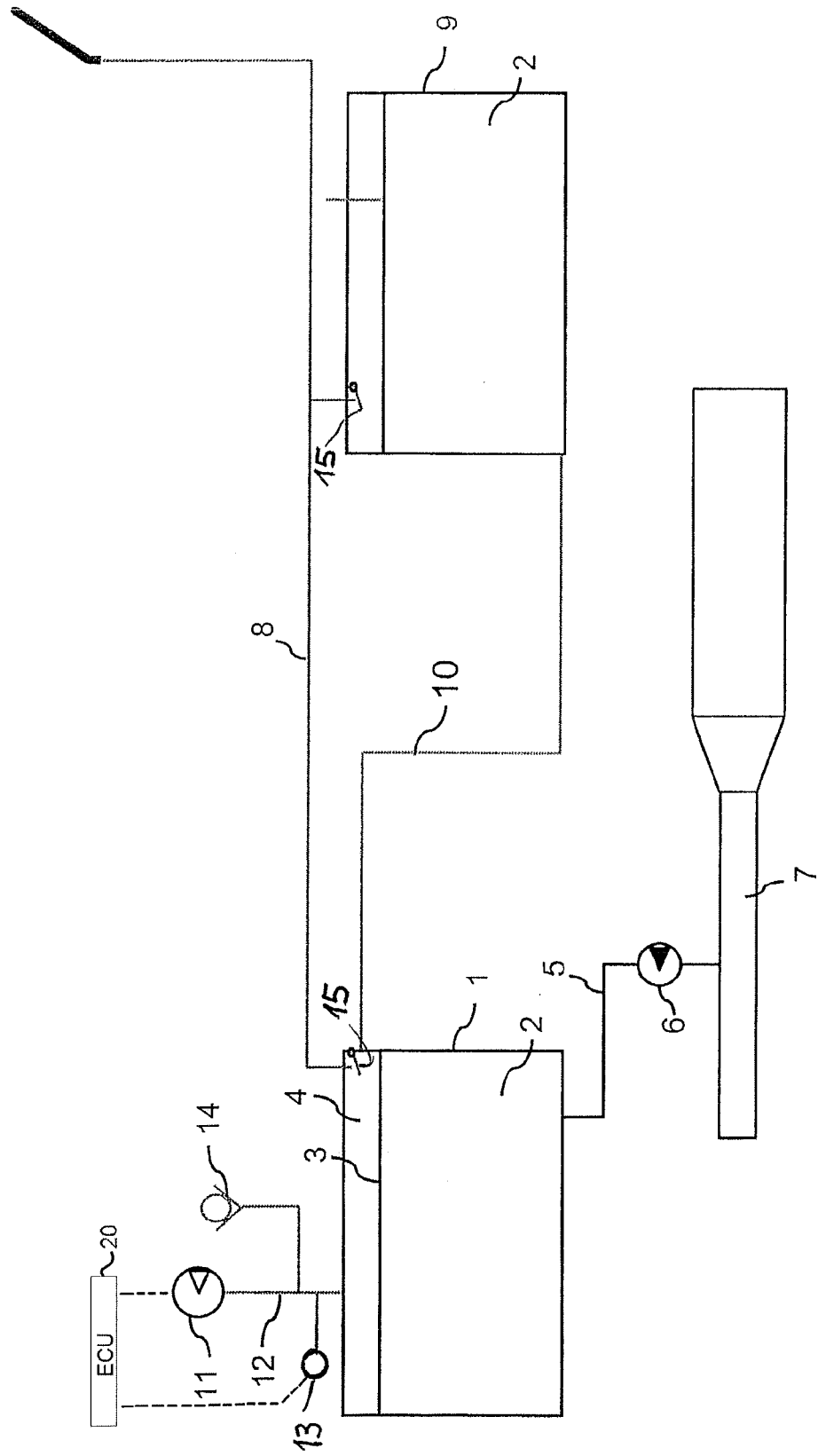

MOTOR VEHICLE HAVING A STORAGE TANK FOR A REDUCING AGENT

CROSS-REFERENCE TO RELATED APPLICATIONS

This application is a continuation of PCT International Application No. PCT/EP2010/068701, filed Dec. 2, 2010, which claims priority under 35 U.S.C. §119 from German Patent Application No. DE 10 2010 005 406.2, filed Jan. 22, 2010, the entire disclosures of which are herein expressly incorporated by reference.

BACKGROUND AND SUMMARY OF THE INVENTION

The invention relates to a motor vehicle having a tank for storing a liquid reducing agent which can be supplied to the exhaust system of an internal-combustion engine provided in the motor vehicle, as well as having an air delivery device, by which an excess pressure can be built-up in an air cushion situated in the tank above the reducing agent level by supplying additional air. Concerning the technical background, reference is particularly made to German Patent document DE 10 2007 026 944 A1.

The injection of a liquid urea solution into the exhaust system of an internal-combustion engine upstream of a so-called reduction catalyst in order to be able to successfully convert harmful constituents of the internal-combustion engine exhaust gas flow in this reduction catalyst is basically known to a person skilled in the art. For an internal-combustion engine situated in motor vehicles, this urea solution representing a liquid reducing agent has to be carried along on board the vehicle. In this case, it is known that a problem to be solved consists of the fact that this liquid reducing agent may freeze at correspondingly low ambient temperatures and can then no longer be supplied to the exhaust system.

A further problem consists of the manner in which this liquid reducing agent is introduced into the exhaust system so that it may be distributed in the exhaust gas flow of the internal combustion engine in the best possible fashion. For this purpose, an injection together with a compressed-air flow has already been suggested. Here, it is, for example, also known from the above-mentioned German Patent document DE 10 2007 026 944 A1 to use the compressed air provided for representing this compressed-air flow also for the delivery of the liquid reducing agent to an injection nozzle provided in the exhaust system. In this case, by use of an air delivery device, an excess pressure can be built up for this compressed air in the cushion of air situated in the tank above the reducing agent level by supplying additional air. Under the influence of this excess pressure, reducing agent from the tank is then transported to the above-mentioned injection nozzle.

Furthermore, it is known that, for various reasons, two or more tanks may be provided for storing the liquid reducing agent in the motor vehicle. For example, merely because of insufficient space in the motor vehicle, it may be necessary to distribute a tank volume required for various reasons to two mutually separate tanks. It may therefore be necessary to provide, in addition to a first tank, from which the reducing agent is fed into the exhaust system, an additional so-called storage tank, from which liquid reducing agent is transferred into the above-mentioned first tank either continuously or as a function of at least one appropriately determined level (in the first tank).

As a function of the arrangement of the two or more tanks relative to one another and as a function of the course of a so-called supply duct, through which additional reducing agent from a further storage tank is supplied to the (first) tank, from which the conveying of reducing agent into the exhaust system takes place, it may be necessary to cause in a targeted manner the transport of further reducing agent through the supply duct by using energy or at least initiate such a transport. It is known to provide an independent pump as the delivery device for the liquid reducing agent for this purpose. However, such an independent pump represents an expenditure whose avoidance is the object of the present invention.

For a motor vehicle having a tank for storing a liquid reducing agent which can be supplied to the exhaust system of an internal-combustion engine provided in the motor vehicle, as well as having an air delivery device, by which an excess pressure can be built-up in an air cushion formed in the tank above the reducing agent level by supplying additional air, this object is achieved in that, by use of the air delivery device already provided (for generating an excess pressure in the cushion of air above the reducing agent level in the tank), as an alternative, a vacuum can be generated in the (above-mentioned) cushion of air, which has at least a supporting effect when reducing agent is fed into the tank. Preferably, the reducing agent can be supplied to the tank by way of this vacuum.

According to the invention, only a single delivery device for air is required, which is connected with the cushion of air in the tank above the reducing agent level. By use of this single air delivery device, liquid reducing agent can be removed from the tank, specifically in that an excess pressure is generated in the above-mentioned cushion of air with respect to an area into which the reducing agent is to be transferred, as well as can be supplied to the above-mentioned tank, specifically in that a vacuum is generated in the above-mentioned cushion of air with respect to an area from which further reducing agent is to be supplied to the tank. By creating such a vacuum, additional reducing agent is quasi-sucked into the tank, for example (or preferably) from an above-mentioned storage tank. As a function of the practical embodiment of the above-mentioned air delivery device, for generating an excess pressure or a vacuum in the above-mentioned cushion of air, for example, simply the rotating direction of the air delivery device can be reversed if, for example, the air delivery device is a simple vane pump. However, as an alternative, the generating of an excess pressure or a vacuum in the cushion of air in the above-mentioned tank above the reducing agent level is also possible by a suitable switching of valves which are provided in ducts appropriately connected with this air cushion or the surroundings as well as the air delivery device.

It is explicitly pointed out that, by use of the vacuum in the tank or in its cushion of air situated above the reducing agent level, not only reducing agent can be sucked into the tank from a storage tank provided in the vehicle but that preferably, after the vehicle is switched off, reducing agent can also be delivered back into the tank from a duct leading from the tank to the injection nozzle or the like in the exhaust pipe, particularly in order to avoid a freezing of the reducing agent in this duct. Such a vacuum may generally also be helpful when filling the tank with reducing agent; thus, also if no additional storage tank is provided in addition to this tank.

If, in addition to the above-mentioned first tank, an (additional) storage tank for liquid reducing agent is provided, this storage tank may be situated essentially at the same geodetic height as the first tank or even below the latter, which generally requires an energy supply for transferring liquid reducing agent from the storage tank into the first tank. In contrast, if the storage tank is geodetically situated above the first tank, a fluid can generally arrive in the first tank from the storage tank merely under the influence of gravity by way of a so-called supply duct. However, because of the risk that this supply duct may freeze, it may be desirable for fluid from the storage tank to arrive in the supply duct only on demand. For this purpose, the generally known principle of the siphon or pipette can now be utilized, according to which, by way of an at first geodetically ascending supply duct, fluid can be delivered from a storage tank into a geodetically lower-situated tank.

According to an advantageous further aspect of the present invention, by generating a vacuum in the cushion of air of the lower-situated tank, liquid reducing agent is therefore first sucked in from the storage tank by using the pipette principle and the hydrostatic pressure as well as the cohesion forces prevailing in the fluid column situated in the supply duct by way of the at first geodetically ascending supply duct, which reducing agent will then automatically flow from the storage tank over into the tank until a sufficiently high excess pressure is generated in the cushion of air of the tank, which pushes the above-mentioned fluid column in the supply duct back into the storage tank.

It was further recognized that, in connection with the removal of reducing agent from the tank, although excess pressure in the latter may be extremely useful under certain marginal conditions, it is not required continuously. This applies particularly if the injection nozzle, by way of which the reducing agent is injected into the exhaust system, is equipped with its own pump. It is basically known to provide a pump-nozzle unit as the injection nozzle, which sucks the required quantity of reducing agent out of the tank. However, at higher temperatures of the reducing agent and/or at a relatively low air pressure in the environment, a steam bubble formation may occur in the suction pipe of this pump-nozzle unit. As a remedial measure, an excess pressure should now be built-up in the air cushion in the above-mentioned tank above the reducing agent level. However, the air delivery device (for air from the environment) provided for this purpose, as an advantageous further development, should be operated only if this is actually necessary, i.e. if there is the danger of a steam bubble formation.

Accordingly, an independent delivery unit is therefore provided for the feeding of reducing agent into the exhaust system, which delivery unit sucks reducing agent out of the tank, in which case, by way of the air delivery device connected with the cushion of air in the tank, as a result of a suitable triggering of the air delivery unit, as a function of at least one suitable marginal condition, excess pressure is generated in the air cushion above the reducing agent level in the tank only to such an extent that no steam bubble formation can occur in the suction pipe of the above-mentioned delivery unit. A relevant temperature, preferably the temperature in the tank, and/or a relevant pressure, preferably the ambient air pressure, can be taken into account as such marginal conditions.

It was further recognized that a conclusion can be drawn concerning the filling level of reducing agent in the tank from the delivery output of the air delivery device for generating a certain excess pressure in the tank or in the cushion of air of the latter, which excess pressure can be determined by use of a sensor. This technique is generally known from the leak test of motor vehicle tank systems and can now also be used here at least for the plausibility of signals of an additional level sensor that is provided in the tank for the reducing agent level. Finally, with respect to a simple construction, the air delivery device can be connected by way of a venting duct of the tank with the cushion of air present in this tank, a venting of the tank taking place through the shut-down air delivery device.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a simplified schematic diagram illustrating an exemplary embodiment according to the present invention.

DETAILED DESCRIPTION OF THE DRAWINGS

Referring to the FIGURE, reference number 1 illustrates a closed tank arranged in a motor vehicle (not shown in detail), which tank 1 is filled with a liquid reducing agent 2, preferably in the form of a urea solution, specifically at a height up to a liquid level or reduction agent level 3. Above this level 3, a cushion of air 4 is arranged in the tank 1. By way of a suction pipe 5, a pump-nozzle unit 6 can suck liquid reduction agent 2 out of the tank and can inject it into an exhaust system 7, only shown in part, of an internal-combustion engine, (not shown) that functions as a drive unit of the motor vehicle. For assisting the suction of reducing agent 2 from the tank 1 by the pump-nozzle unit 6, an excess pressure can be built-up in the cushion of air 4 above the liquid level 3 of the tank by way of an air delivery device 11. In this case, the air delivery device 11 delivers air from the environment by way of an air duct 12 into the tank 1 or into the cushion of air 4 situated above the liquid reducing agent 2 in the tank.

When the reducing agent stored in the tank 1 has almost entirely been removed from the tank 1, the tank 1 can, preferably during a service shop visit of the motor vehicle, be filled again with new reducing agent 2 by way of a filling pipe 8 that leads into the tank 1. In order to keep the maintenance intervals between such service shop visits as large as possible, a further storage tank 9 for liquid reducing agent 2 is provided in the vehicle, in addition to the tank 1. The further storage tank 9 can also (during a visit of the motor vehicle in the service shop) be filled by way of a filling pipe 8. Thus, if, at a point in time after a larger amount of reducing agent 2 had been removed from the tank 1 and been supplied to the exhaust system 7, only a small amount of reducing agent 2 is still situated in the tank 1,—which can be detected by use of a (not shown) level sensor by an shown) electronic control unit 20—reducing agent first stored in the storage tank 9 can be transferred into the tank 1 without requiring that a fill-up by way of the filling pipe 8 has to take place. For this purpose, by way of a supply pipe 10, which leads into the cushion of air 4 of the tank 1, the tank 1 is connected with the interior of the storage tank 9, specifically, preferably at a geodetically lowest point of the storage tank 9.

By way of the arrangement illustrated in the schematic diagram, in which the tank 1 and the storage tank 9 (coincidentally) are essentially situated at the same geodetic height, work has to be carried out as a result of the course of the supply pipe 10 illustrated in the FIGURE, in order to transfer reducing agent 2 from the storage tank 9 into the tank 1. As the driving force for this transfer, a vacuum is generated in the cushion of air 4 of the closed tank 1 by way of the air delivery device 11 in the form of a vane pump, in that this vane pump or air delivery device 11 sucks air from the cushion of air 4 by way of the air duct 12 and delivers it into the open environment. Naturally, such a buildup of vacuum in the tank 1 or in its cushion of air 4 will be possible only if the tank 1 is closed off with respect to the environment. In the mouth area of the filling pipe 8, a so-called fill cap 15 is therefore provided in the tank 1, which fill cap 15 will tightly seal and close off the mouth opening of the filling pipe 8 in the tank 1 when no filling is taking place by way of this filling pipe 8. For reasons of safety, an analogous fill cap 15 is provided in the mouth area of the filling pipe 8 in the further storage tank 9.

A pressure sensor 13 is connected to the air duct 12 leading from the air delivery device 9 into the cushion of air 4 of the tank 1, by which pressure sensor 13, the pressure existing in the cushion of air 4 can therefore be determined and can be transmitted to the above-mentioned electronic control unit 20. Furthermore, for reasons of safety, a pipe leading to an excess pressure valve 14 branches off the air duct 12, in which case the excess pressure valve 14 opens up into the environment when a certain pressure threshold value is exceeded.

However, the fact that a vacuum with respect to the pressure existing in the storage tank 9 can be generated in the cushion of air by use of the air delivery device 11, in order to suck reducing agent 2 out of the storage tank 9 into the tank 1, is only one aspect. Specifically, in addition,—as briefly explained above—, an excess pressure can also be generated in the cushion of air 4 by way of the air delivery device 11 in that air is supplied to the cushion of air cushion 4 from the environment by way of the air delivery device 11. The reducing agent 2 situated in the tank 1 is therefore under increased pressure, so that, also under adverse conditions, no steam bubble formation can take place in the suction pipe 5 in the reducing agent 2 situated there, so that the pump-nozzle unit 6 will always reliably obtain the required quantity of reducing agent 2. In this case, it is explicitly pointed out that the latter function of the air delivery device 11 is virtually independent of its first-described function, specifically the generating of vacuum in the cushion of air 4, although a combination of these two functions in the sense of joining the functions is naturally especially advantageous.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for use in a motor vehicle, comprising:
   a tank for storing a liquid reducing agent, the tank being coupled via a pipe to an exhaust system of an internal-combustion engine arranged in the motor vehicle to supply the liquid reducing agent to the exhaust system;
   an air delivery device coupled with the tank, the air delivery device not being arranged in the pipe and being operatively configured to both:
   (a) build-up an excess pressure in a cushion of air located in the tank above a surface of the liquid reducing agent by supplying additional air into the tank; and
   (b) generate a vacuum in the cushion of air above the surface of the liquid reducing agent, said vacuum facilitating feeding of additional liquid reducing agent into the tank.

2. The system according to claim 1, wherein the air delivery device is connected via a venting duct of the tank with the cushion of air present in the tank, a venting of the tank occurring through the air delivery device in a shut-down state.

3. The system according to claim 1, further comprising an electronic control unit coupled with the air delivery unit, the electronic control unit drawing a conclusion concerning a fill level of the liquid reducing agent in the tank as a function of delivery output of the air delivery device for generating a certain excess pressure in the tank.

4. The system according to claim 1, wherein the vacuum generated by the air delivery device operates to supply additional liquid reducing agent to the tank by way of a supply duct.

5. The system according to claim 4, wherein a certain amount of liquid reducing agent from a geodetically higher-situated storage tank is supplied to the tank, in that first by generating the vacuum in the cushion of air of the tank, liquid reducing agent is first sucked in from the higher-situated storage tank by using a pipette principle and hydrostatic pressure, as well as via cohesion forces prevailing in a fluid column formed in the supply duct by way of a first geodetically ascending supply duct, which reducing agent will then automatically flow from the higher-situated storage tank over into the tank until a sufficiently high excess pressure is generated in the cushion of air in the tank, which then pushes the formed fluid column in the supply duct back into the higher-situated storage tank.

6. The system according to claim 1, further comprising:
   a pump-nozzle unit operatively configured for feeding liquid reducing agent into the exhaust system, the pump-nozzle unit sucking reducing agent out of the tank;
   wherein, upon a triggering of the air delivery device as a function of at least one marginal condition, excess pressure is generated in the cushion of air in the tank via the air delivery device only to an extent such that no steam bubble formation occurs in a suction pipe of the pump-nozzle unit.

7. The system according to claim 6, wherein at least one of a relevant temperature and a relevant pressure are factored into account in the triggering of the air delivery device.

8. The system according to claim 7, wherein the relevant temperature is a temperature in the tank, and further wherein a relevant pressure is an ambient air pressure.

9. The system according to claim 1, wherein said vacuum generated by the air delivery device operates to return liquid reducing agent from the pipe leading to the exhaust system back into the tank.

10. The system according to claim 9, wherein a certain amount of liquid reducing agent from a geodetically higher-situated storage tank is supplied to the tank, in that first by generating the vacuum in the cushion of air of the tank, liquid reducing agent is first sucked in from the higher-situated storage tank by using a pipette principle and hydrostatic pressure, as well as via cohesion forces prevailing in a fluid column formed in the supply duct by way of a first geodetically ascending supply duct, which reducing agent will then automatically flow from the higher-situated storage tank over into the tank until a sufficiently high excess pressure is generated in the cushion of air in the tank, which then pushes the formed fluid column in the supply duct back into the higher-situated storage tank.

11. The system according to claim 9, wherein the vacuum generated by the air delivery device operates to supply additional liquid reducing agent to the tank by way of a supply duct.

12. The system according to claim 11, wherein a certain amount of liquid reducing agent from a geodetically higher-situated storage tank is supplied to the tank, in that first by generating the vacuum in the cushion of air of the tank, liquid reducing agent is first sucked in from the higher-situated storage tank by using a pipette principle and hydrostatic pressure, as well as via cohesion forces prevailing in a fluid column formed in the supply duct by way of a first geodetically ascending supply duct, which reducing agent will then automatically flow from the higher-situated storage tank over into the tank until a sufficiently high excess pressure is generated in the cushion of air in the tank, which then pushes the formed fluid column in the supply duct back into the higher-situated storage tank.

13. A motor vehicle, comprising:
    an exhaust system of an internal combustion engine arranged in the motor vehicle;
    a tank for storing a liquid reducing agent, the tank being coupled via a pipe with the exhaust system to supply the liquid reducing agent to the exhaust system;
    an air delivery device coupled with the tank, the air delivery device not being arranged in the pipe and being operatively configured to both:
    (a) build-up an excess pressure in a cushion of air located in the tank above a surface of the liquid reducing agent by supplying additional air; and
    (b) generate a vacuum in the cushion of air above the surface of the liquid reducing agent, said vacuum facilitating feeding of additional liquid reducing agent into the tank.

14. In a motor vehicle having a tank for storing a liquid reducing agent suppliable via a pipe to an exhaust system of an internal-combustion engine arranged in the motor vehicle, a method comprising the acts of:
    building-up an excess pressure in a cushion of air, via an air delivery device not arranged in the pipe, in the tank above a surface of the liquid reducing agent in the tank, the excess pressure facilitating transport of the liquid reducing agent out of the tank to the exhaust system; and
    creating a vacuum in the cushion of air, using the same air delivery device, the vacuum facilitating a feeding of liquid reducing agent into the tank.

15. The method according to claim 14, further comprising the act of:
    after switching-off of the motor vehicle, delivering the liquid reducing agent, which is in a duct that leads from the tank toward the exhaust system, back into the tank via the vacuum created in the cushion of air.

16. The method according to claim 14, wherein a certain amount of liquid reducing agent from a geodetically higher-situated storage tank is supplied to the tank, in that first by generating the vacuum in the cushion of air of the tank, liquid reducing agent is first sucked in from the higher-situated storage tank by using a pipette principle and hydrostatic pressure, as well as via cohesion forces prevailing in a fluid column formed in the supply duct by way of a first geodetically ascending supply duct, which reducing agent will then automatically flow from the higher-situated storage tank over into the tank until a sufficiently high excess pressure is generated in the cushion of air in the tank, which then pushes the formed fluid column in the supply duct back into the higher-situated storage tank.

17. The method according to claim 16, further comprising the acts of:
    feeding liquid reducing agent into the exhaust system via a pump-nozzle unit, the pump-nozzle unit sucking reducing agent out of the tank;
    wherein, upon a triggering of the air delivery device as a function of at least one marginal condition, generating excess pressure in the cushion of air in the tank via the air delivery device only to an extent such that no steam bubble formation occurs in a suction pipe of the pump-nozzle unit.

* * * * *